United States Patent
Shi et al.

(10) Patent No.: US 12,511,453 B2
(45) Date of Patent: Dec. 30, 2025

(54) METHOD AND SYSTEM FOR CUTTING STRUCTURE OF PDC DRILL BIT WITH SPIRAL BLADES

(71) Applicant: SOUTHWEST PETROLEUM UNIVERSITY, Chengdu (CN)

(72) Inventors: Xiangchao Shi, Chengdu (CN); Zhaowei Wang, Chengdu (CN); Maoping Gao, Chengdu (CN); Shuai Chen, Chengdu (CN); Ye Jiao, Chengdu (CN); Rongrong Wang, Chengdu (CN); Zonglin Lyu, Chengdu (CN)

(*) Notice: Subject to any disclaimer, the term of this patent is extended or adjusted under 35 U.S.C. 154(b) by 0 days.

(21) Appl. No.: 19/019,795

(22) Filed: Jan. 14, 2025

(65) Prior Publication Data

US 2025/0284857 A1    Sep. 11, 2025

(30) Foreign Application Priority Data

Mar. 11, 2024   (CN) .......................... 202410273037.5

(51) Int. Cl.
*G06F 30/17*    (2020.01)
*G06F 30/23*    (2020.01)
(Continued)

(52) U.S. Cl.
CPC .............. *G06F 30/17* (2020.01); *G06F 30/23* (2020.01); *G06F 2111/10* (2020.01); *G06F 2119/14* (2020.01)

(58) Field of Classification Search
CPC .......... G06F 30/00; G06F 30/17; G06F 30/23; G06F 2111/10; G06F 2119/14; E21B 2200/00
(Continued)

(56) References Cited

U.S. PATENT DOCUMENTS

2023/0161927 A1    5/2023  Stiles et al.

FOREIGN PATENT DOCUMENTS

| CN | 109661502 A | 4/2019 |
| CN | 110399699 A | 11/2019 |

(Continued)

OTHER PUBLICATIONS

Al Shekaili, Ahmed et al., "Drilling Performance Analysis of a Polycrystalline Diamond Compact Bit via Finite Element and Experimental Investigations", Aug. 20, 2024, International Journal of Rock Mechanics and Mining Sciences 182, Elsevier Ltd. (Year: 2024).*

(Continued)

*Primary Examiner* — Cedric Johnson
(74) *Attorney, Agent, or Firm* — Addison D. Ault; IPGentleman Intellectual Property Services, LLC

(57) ABSTRACT

A design method and system for a cutting structure of a PDC drill bit with spiral blades is provided, including carrying out uniaxial and triaxial compressive strength tests on outcrops or underground cores to obtain rock mechanical parameters; establishing a three-dimensional cutting structure of the PDC drill bit based on an archimedean spiral and front and rear row teeth of the PDC drill bit; establishing a bit-rock finite element model based on the rock mechanical parameters and the three-dimensional cutting structure of the PDC drill bit; obtaining a time history curve for weight-on-bit and torque-on-bit based on the bit-rock finite element model; establishing a design scheme for the cutting structure of the PDC drill bit based on the time history curve; and obtaining the cutting structure of PDC drill bit with spiral blades based on the design scheme for the cutting structure of the PDC drill bit.

5 Claims, 14 Drawing Sheets

(51) Int. Cl.
    *G06F 111/10*     (2020.01)
    *G06F 119/14*     (2020.01)

(58) Field of Classification Search
    USPC .......................................................... 703/6
    See application file for complete search history.

(56) References Cited

FOREIGN PATENT DOCUMENTS

| | | | | |
|---|---|---|---|---|
| CN | 115749730 A | | 3/2023 | |
| CN | 116151058 A | * | 5/2023 | ............. G06F 30/12 |
| CN | 116562079 A | | 8/2023 | |

OTHER PUBLICATIONS

Wang, Zhaowei et al,, "Enhancement on PDC Bit Based on Archimedean Spiral Control Method", Jul. 27, 2024, Geoenergy Science and Energy 241, Elsevier B.V. (Year: 2024).*

Chao Wang, Study on the Interpretation Methods of Downhole Working Conditions Based on the Near-bit Measurement, Chinese Doctoral Dissertations Full-text Database, Feb. 15, 2023, pp. 1-150 (abstract translated pp. IV-VI) Claims involved:1-8.

Lulin Kong, et al., Selection and Optimization Design of PDC Bits Based on FEM Analysis for Drilling Long Horizontal Sections of Shale Formations, Processes 2023, Sep. 21, 2023, vol. 11, 2807, pp. 1-17 DOI: 10.3390/pr11092807 Claims involved: 1-8.

Luo Ming, et al., A V-cutter PDC bit suitable for ultra-HTHP plastic mudstones, Natural Gas Industry, Apr. 25, 2021, pp. 97-106, vol. 41, No. 4 (abstract translated) DOI: 10.3787/j.issn.1000-0976.2021.04.011 Claims involved:1-8.

Notification to Grant Patent Right for Invention dated Jan. 7, 2025 in SIPO application No. 202410273037.5.

Retrieval report dated Jan. 2, 2025 in SIPO application No. 202410273037.5.

Notice of the First Office Action dated Sep. 20, 2024 in SIPO application No. 202410273037.5.

First Search Report dated Sep. 14, 2025 in SIPO application No. 202410273037.5.

* cited by examiner

METHOD AND SYSTEM FOR CUTTING STRUCTURE OF PDC DRILL BIT WITH SPIRAL BLADES

CROSS-REFERENCE TO RELATED APPLICATIONS

This application claims priority to Chinese Patent Application No. 202410273037.5, filed on Mar. 11, 2024, the contents of which are hereby incorporated by reference.

TECHNICAL FIELD

The disclosure belongs to the fields of oil field machinery, oil and gas well construction and the like, and particularly relates to a design method and system for a cutting structure of a Polycrystalline Diamond Compact (PDC) drill bit with spiral blades.

BACKGROUND

Polycrystalline diamond compact (PDC) drill bit is widely used in shale gas exploitation. In engineering application, the improvement and design of PDC drill bit mainly focus cutting structure, and balances the rock breaking efficiency and stability from aspects of single tooth structure, radial/circumferential tooth distribution and tooth material selection which are related to the engineering application effect. Although the effect of engineering test can directly reflect effectiveness of the improved design example of PDC drill bit, the improved design and manufacture of PDC drill bit takes a design cycle of 12 weeks. Under the influence of complex engineering factors, the trial and error cost of design example is high, which requires rich experience in the development and design of bit improvement. Although the simple single tooth/tooth group cutting structure is subjected to a series of experimental studies in the laboratory, the quantitative study on the influence of multi-parameter coupling design examples with consideration of helicity on the rock breaking effect of full bit is still rare. The previous research on single tooth and tooth group suggests that at there are significant differences in rock breaking efficiency or stability of cutting structure with different designed cutting sections. In some engineering cases, the design example of spiral blade is considered to reduce the probability of rotary motion of bit and improve drilling stability (Improved Bit Stability Reduces Downhole Harmonics (Vibrations): SPE/IADC Asia Pacific Drilling Technology, 1996 Sep. 9, Development of Whirl Resistant PDC drill bits: SPE Latin America/Caribbean Petroleum Engineering Conference, 1994 Apr. 27), which is currently mainly embodied through design patterns, such as "straight line-circular arc-straight line", "straight-line-circular arc-circular arc", or archimedean spiral, etc., but the helicity of the blade is not defined by a certain design pattern, and the design is arbitrary, so the role of helicity in aggression and stability has not been studied or discussed systematically. In order to solve this problem, it is particularly important to propose a design method and system that can quantitatively describe the helicity of blade and find out the degree of vibration reduction and efficiency improvement of helicity under different designed cutting sections.

SUMMARY

The disclosure aims at solving the shortcomings of the prior art, and provides a design method and system for a cutting structure of a PDC drill bit with spiral blades, which provides theoretical support for design of high-efficiency and stable PDC drill bit with spiral blades.

In order to achieve the above objectives, the present disclosure provides the following scheme.

A design method for a cutting structure of a PDC drill bit with spiral blades includes following steps:

carrying out uniaxial and triaxial compressive strength tests on outcrops or underground cores to obtain rock mechanical parameters;

establishing a three-dimensional cutting structure of the PDC drill bit based on an archimedean spiral and front and rear row teeth of the PDC drill bit;

establishing a bit-rock finite element model based on the rock mechanical parameters and the three-dimensional cutting structure of the PDC drill bit;

obtaining a time history curve for weight-on-bit and torque-on-bit based on the bit-rock finite element model;

establishing a design scheme for the cutting structure of the PDC drill bit based on the time history curve for weight-on-bit and torque-on-bit; and obtaining the cutting structure of PDC drill bit with spiral blades based on the design scheme for the cutting structure of the PDC drill bit.

Optionally, the rock mechanical parameters include density $\rho$, elastic modulus E, Poisson's ratio $\mu$, internal friction angle $\varphi$ and cohesion c.

Optionally, a method for establishing the three-dimensional cutting structure of the PDC drill bit includes:

controlling a designed cutting section of a downhole based on a level of different track and a cutting depth control distance of the front and rear row teeth, where when the front and rear row teeth are on different tracks in a degree of the equidistance with an adjacent front row teeth centers, the level of different track is expressed as a multiple of the equidistance between the front row teeth centers;

controlling a circumferential tooth distribution reference of the spiral blades based on the archimedean spiral; and establishing the three-dimensional cutting structure of the PDC drill bit based on the designed cutting section of the downhole and the circumferential tooth distribution reference of the spiral blades.

Optionally, the designed cutting section of the downhole includes projections or bodies of front row teeth, rear row teeth, rear row teeth with different tracks, rear row teeth with a same track, radial tooth distribution lines of the front row teeth, radial tooth distribution lines of the rear row teeth and the cutting depth control distance of front and rear row teeth on a radial tooth distribution view.

Optionally, boundary conditions of the bit-rock finite element model are rate of penetration and rotational speed near drill bit.

Optionally, a method of establishing the design scheme for the cutting structure of the PDC drill bit based on the time history curve for weight-on-bit and torque-on-bit includes:

carrying out statistical calculation on a stable cutting section of the time history curve for WOB and TOB to obtain a weight-on-bit mean value, a torque-on-bit mean value, a weight-on-bit standard deviation and a torque-on-bit standard deviation;

obtaining mechanical specific energy based on the weight-on-bit mean value and the torque-on-bit mean value;

obtaining an axial/circumferential vibration amplitude based on the weight-on-bit standard deviation and the torque-on-bit standard deviation;

taking a triaxial compressive strength under pressure of downhole liquid column as a mechanical specific energy reference;

obtaining a mechanical specific energy change rate based on the mechanical specific energy and the mechanical specific energy reference; and obtaining the design scheme for the cutting structure of the PDC drill bit based on the axial/circumferential vibration amplitude and the mechanical specific energy change rate.

Optionally, design parameters of the design scheme for the cutting structure of the PDC drill bit include level of different track of the front and rear row teeth, the cutting depth control distance of the front and rear row teeth and polar angle span.

The present disclosure further provides a design system for a cutting structure of a PDC drill bit with spiral blades, used for realizing the above-mentioned design method, including:

a test module, used for carrying out the uniaxial and triaxial compressive strength tests on the outcrops or the underground cores to obtain the rock mechanical parameters;

a three-dimensional structure building module, used for establishing the three-dimensional cutting structure of the PDC drill bit based on the archimedean spiral and the front and rear row teeth of the PDC drill bit;

a model building module, used for establishing the bit-rock finite element model based on the rock mechanical parameters and the three-dimensional cutting structure of the PDC drill bit;

a time history curve acquisition module, used for obtaining the time history curve for weight-on-bit and torque-on-bit based on the bit-rock finite element model;

a design scheme establishment module, used for establishing the design scheme for the cutting structure of the PDC drill bit based on the time history curve for weight-on-bit and torque-on-bit; and a design scheme application module, used for obtaining the cutting structure of PDC drill bit with spiral blades based on the design scheme for the cutting structure of the PDC drill bit.

Compared with the prior art, the present disclosure has following technical effects:

In the design method for a cutting structure of a PDC drill bit with spiral blades according to the present disclosure, establishing a three-dimensional cutting structure of the PDC drill bit based on an archimedean spiral and front and rear row teeth of the PDC drill bit solves the problems of arbitrary design of blade helicity and insufficient understanding of the influence of blade helicity on rock breaking efficiency and vibration characteristics of near drill bit. Also, based on rock mechanical parameters and the three-dimensional cutting structure of the PDC drill bit, the bit-rock finite element model is established. Based on the bit-rock finite element model, the time history curve of weight-on-bit and torque-on-bit is obtained. Based on the time history curve of weight-on-bit and torque-on-bit, the design scheme for the cutting structure of PDC drill bit is established. Some design schemes of cutting structure reserve for efficient and stable spiral PDC drill bit are put forward, which provides theoretical support for the design of efficient and stable spiral blade PDC drill bit. According to the disclosure, the helicity of the blade is quantitatively described, and the coupling influence mechanism of the helicity and the cutting section on the rock breaking efficiency and stability of the PDC drill bit is obtained, so that a high-cost engineering test is avoided, and the proposed design scheme can improve the rock breaking efficiency of the PDC drill bit and improve the stability near drill bit at the same time.

BRIEF DESCRIPTION OF THE DRAWINGS

In order to explain the technical scheme of the present disclosure more clearly, the drawings needed to be used in the embodiments are briefly introduced below. Obviously, the drawings in the following description are only some embodiments of the present disclosure. For ordinary technicians in the field, other drawings may be obtained according to these drawings without paying creative labor.

DETAILED DESCRIPTION OF THE EMBODIMENTS

In the following, the technical scheme in the embodiments of the disclosure will be clearly and completely described with reference to the attached drawings. Obviously, the described embodiments are only a part of the embodiments of the disclosure, but not all embodiments. Based on the embodiments in the present disclosure, all other embodiments obtained by ordinary technicians in the field without creative labor belong to the scope of protection of the present disclosure.

In order to make the above objectives, features and advantages of the present disclosure more obvious and easier to understand, the present disclosure will be further described in detail with the attached drawings and specific embodiments.

Embodiment 1

Figure 1:
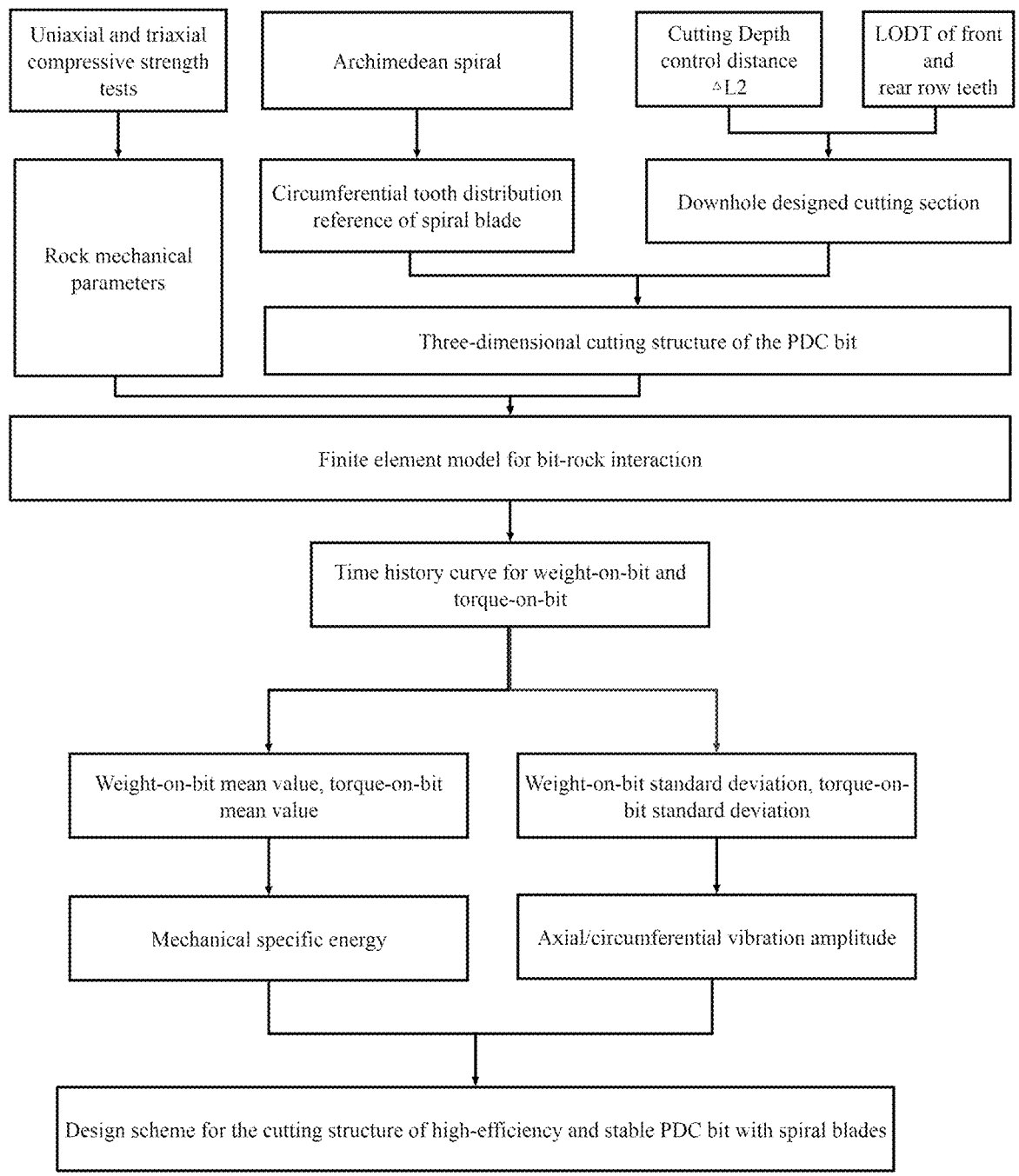
FIG. 1 is a schematic flow chart of a design method for a cutting structure of a PDC drill bit with spiral blades provided by an embodiment of the present disclosure.

As shown in FIG. 1, a design method for a cutting structure of a PDC drill bit with spiral blades, including following steps.

Uniaxial and triaxial compressive strength tests are carried out on outcrops or underground cores to obtain rock mechanical parameters.

In an embodiment, the rock mechanical parameters include density ρ, elastic modulus E, Poisson's ratio μ, internal friction angle φ and cohesion c. The stress-equivalent plastic strain curve in the hardening stage is calculated and obtained according to the following formula:

$$\varepsilon_{ln}^{pl} = \ln(1 + \varepsilon_{nom}) - \frac{\sigma_{true}}{E}, \tag{1}$$

where $\sigma_{true}$ represents true stress, in unit of MPa, $\varepsilon_{nom}$ represents nominal strain, dimensionless, $\varepsilon_{ln}^{pl}$ represents equivalent plastic strain, dimensionless, and E represents modulus elastic modulus, in unit of Gpa.

A three-dimensional cutting structure of the PDC drill bit is established based on an archimedean spiral and front and rear row teeth of the PDC drill bit.

In an embodiment, a method for establishing the three-dimensional cutting structure of the PDC drill bit includes following steps.

Figure 2:
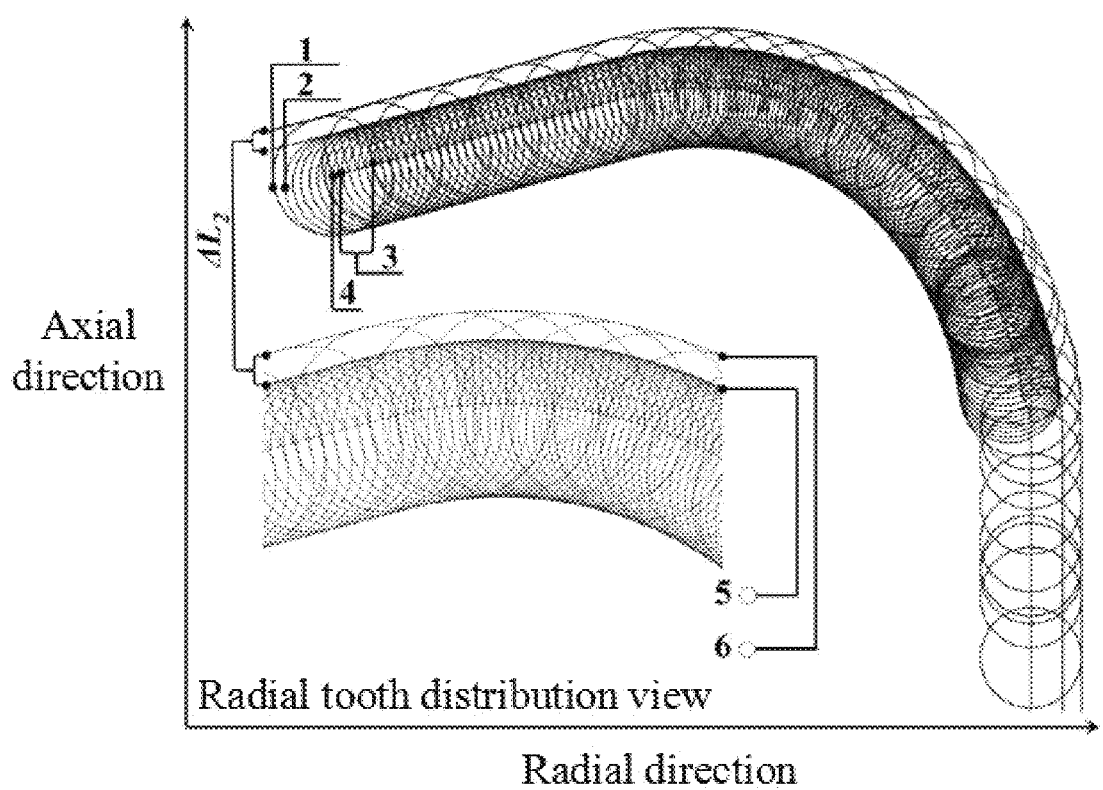
FIG. 2 is a schematic view of radial tooth distribution view of PDC drill bit with spiral blades.

A designed cutting section of a downhole is controlled based on a level of different track and a cutting depth control distance of the front and rear row teeth, where when the front and rear row teeth are on different tracks in a degree of the equidistance with an adjacent front row teeth centers, the level of different track is expressed as a multiple of the equidistance between the front row teeth centers A circumferential tooth distribution reference of the spiral blades is controlled based on the archimedean spiral;

Specifically, level of different track LODT and the cutting depth control distance $\Delta L_2$ of front and rear row teeth on a radial tooth distribution view are used to control designed cutting section of downhole: as shown in FIG. 2, the designed cutting section of the downhole mainly includes projections or bodies of front row teeth 1, rear row teeth 2, rear row teeth 3 with different tracks, rear row teeth 4 with a same track, radial tooth distribution lines 5 of the front row teeth, radial tooth distribution lines 6 of the rear row teeth and the cutting depth control distance $\Delta L_2$ of front and rear row teeth on a radial tooth distribution view. When the front and rear row teeth are on different tracks in a degree of the equidistance with an adjacent front row teeth 1 centers, the level of different track LODT is expressed as a multiple of the equidistance between the front row teeth 1 centers; When all rear row teeth 2 are on the same track as the front row teeth 1, the rear row teeth 2 are called rear row teeth 4 on the same track. At this time, the level of different track LODT is considered to be 0. When the rear row teeth 2 are off track with the front row teeth 1, the rear row teeth 2 are called rear row teeth 3 with different tracks, and the level of different track LODT varies with a certain span in a certain interval (As in the specific case of the present disclosure: interval [0,5/6], span 1/6); the included angle between each blade azimuth line 9 and the due cast direction is defined as the blade azimuth. The circumferential tooth distribution reference 7 of the front row teeth and the dotted line 10 of the bit diameter form an intersection point K, and a straight line is drawn from the drill center O to K. The included angle between the straight line OK and the blade azimuth line is the polar angle span $\theta_{span}$.

Figure 3:
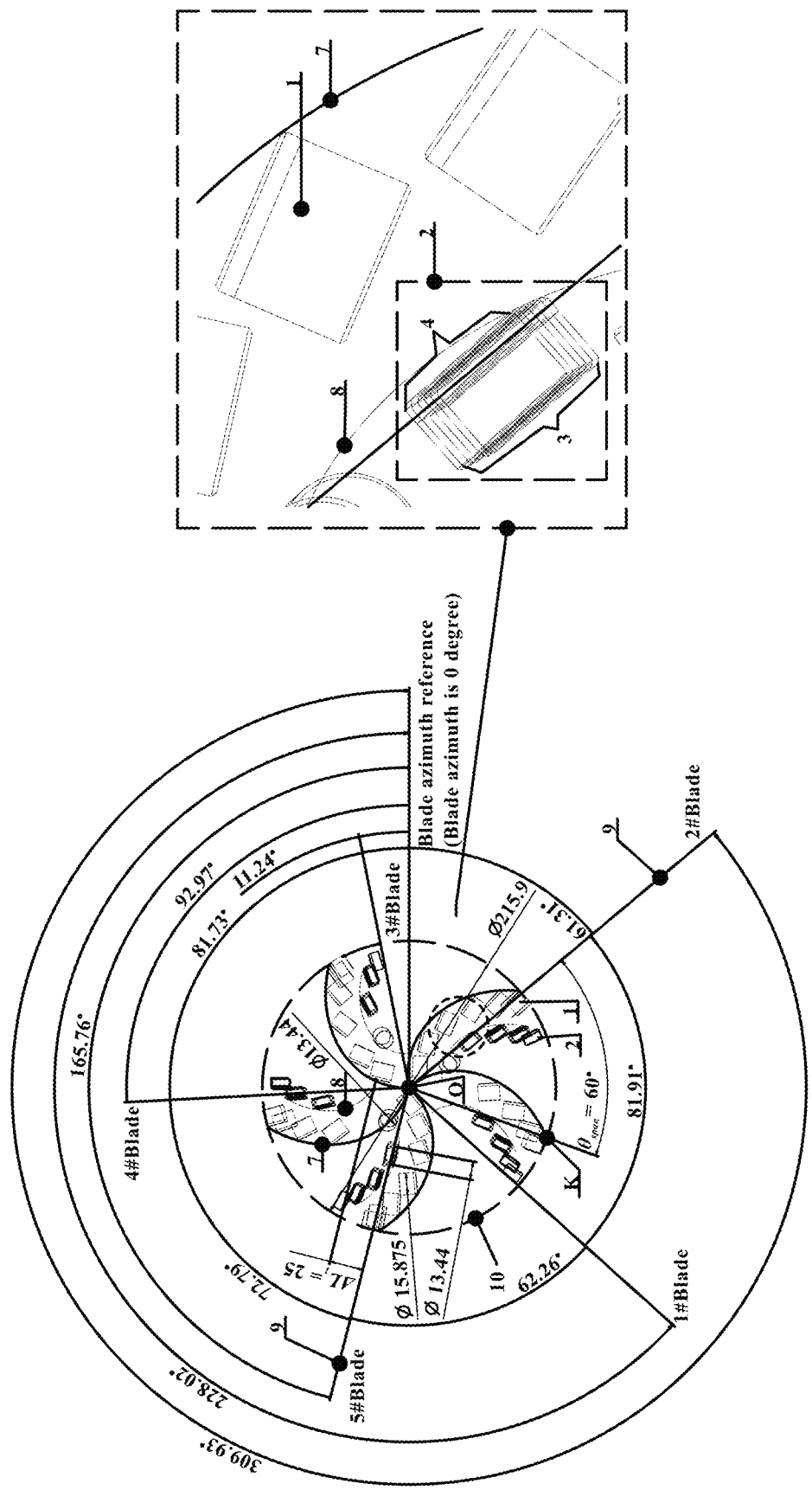
FIG. 3 is a three-dimensional model engineering drawing of PDC drill bit with spiral blades.

In the polar angle span $\theta_{span}$ interval, the circumferential tooth distribution reference 7 of the front row teeth is controlled with a certain span (As in the specific case of the present disclosure: the interval [0, 60°], with 12° as a span) according to the following formula based on archimedean spiral, and the control parameter A is shown in Table 1. The circumferential tooth distribution reference 8 of the rear row teeth is obtained by the offset distance $\Delta L_1$ of the circumferential tooth distribution reference 7 of the front row teeth (straight blade $\Delta L_1=17$ mm, spiral blade $\Delta L_1=25$ mm, offset distance $\Delta L_1$ may be adjusted for machine process). Under the condition that the back inclination angle and the side inclination angle are both 0, one end of each single tooth surface contacts with the spiral "point-point", so as to ensure that the projection of the contact point between each tooth and the stratum in the top view is consistent with the spiral at the beginning of cutting. Taking the polar angle span $\theta_{span}=60°$ as an example, the engineering drawing of the three-dimensional model of the PDC drill bit with spiral blade is shown in FIG. 3.

$$r = A\theta_{span} + B, \tag{2}$$

$$\frac{d\theta_{span}}{dr} = A^{-1}, \tag{3}$$

In the above formula, r represents the radial distance, mm; A represents the radial distance value that increases with each increase of unit angle r of the spiral, mm; $\theta_{span}$—polar angle span, °; B represents the distance from the starting point to the polar coordinate origin when $\theta_{span}$ is 0, mm, which is taken as 0 mm in this embodiment.

TABLE 1

| $\theta_{span}$, ° | 0 | 12 | 24 | 36 | 48 | 60 |
|---|---|---|---|---|---|---|
| A, mm | +∞ | 8.995 | 4.498 | 2.999 | 2.249 | 1.799 |

Therefore, a three-dimensional cutting structure of the PDC drill bit is established based on the designed cutting section of downhole and circumferential tooth distribution references of spiral blades.

A bit-rock finite element model is established based on the rock mechanical parameters and the three-dimensional cutting structure of the PDC drill bit.

In an embodiment, boundary conditions of the bit-rock finite element model are rate of penetration ROP and rotational speed near drill bit RPM.

Figure 4:
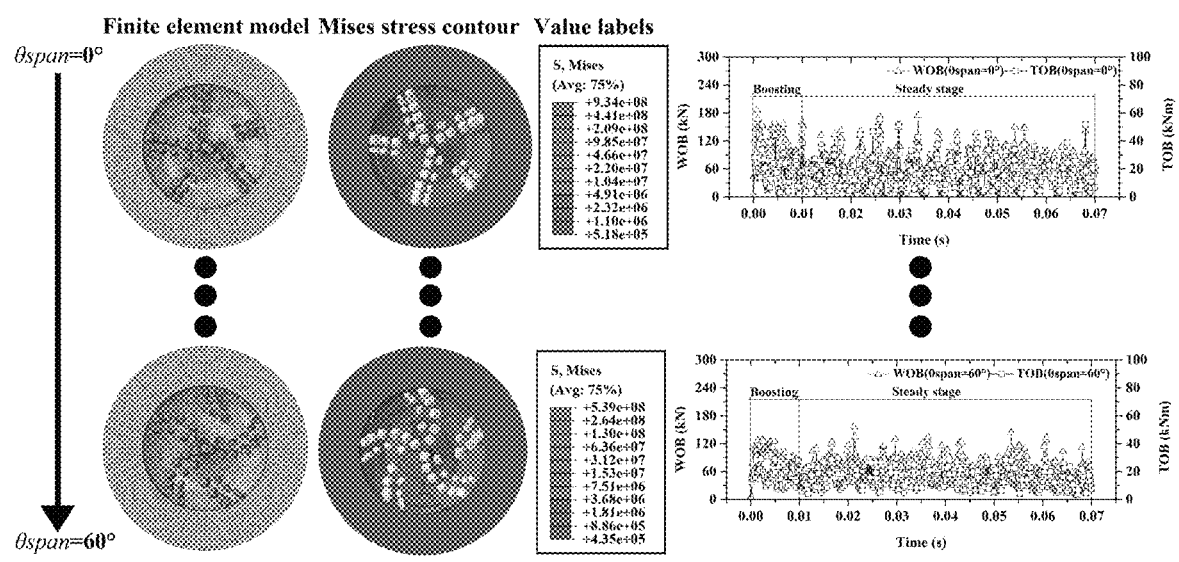
FIG. 4 is a schematic diagram of the solution result of the finite element model.
Figure 5:
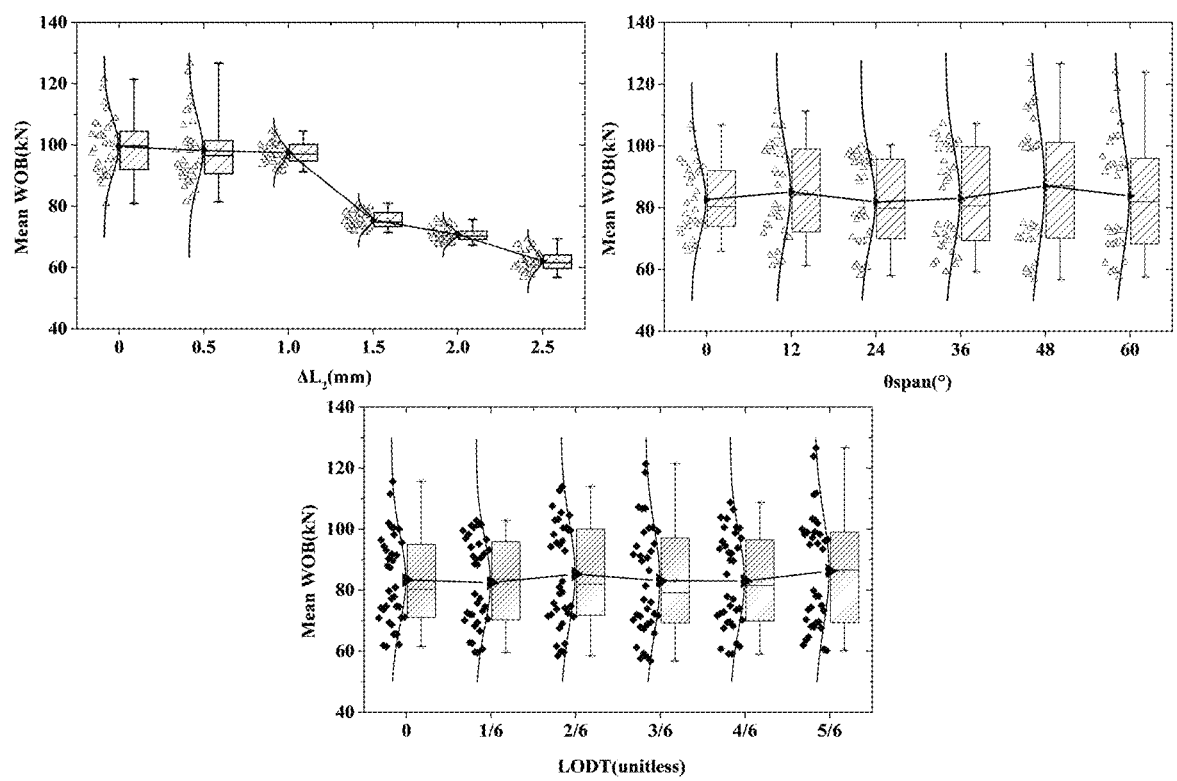
FIG. 5 is a schematic diagram of the influence of cutting depth control distance $\Delta L_2$, polar angle span $\theta_{span}$ and level of different track LODT on the weight-on-bit mean value Mean WOB.
Figure 6:
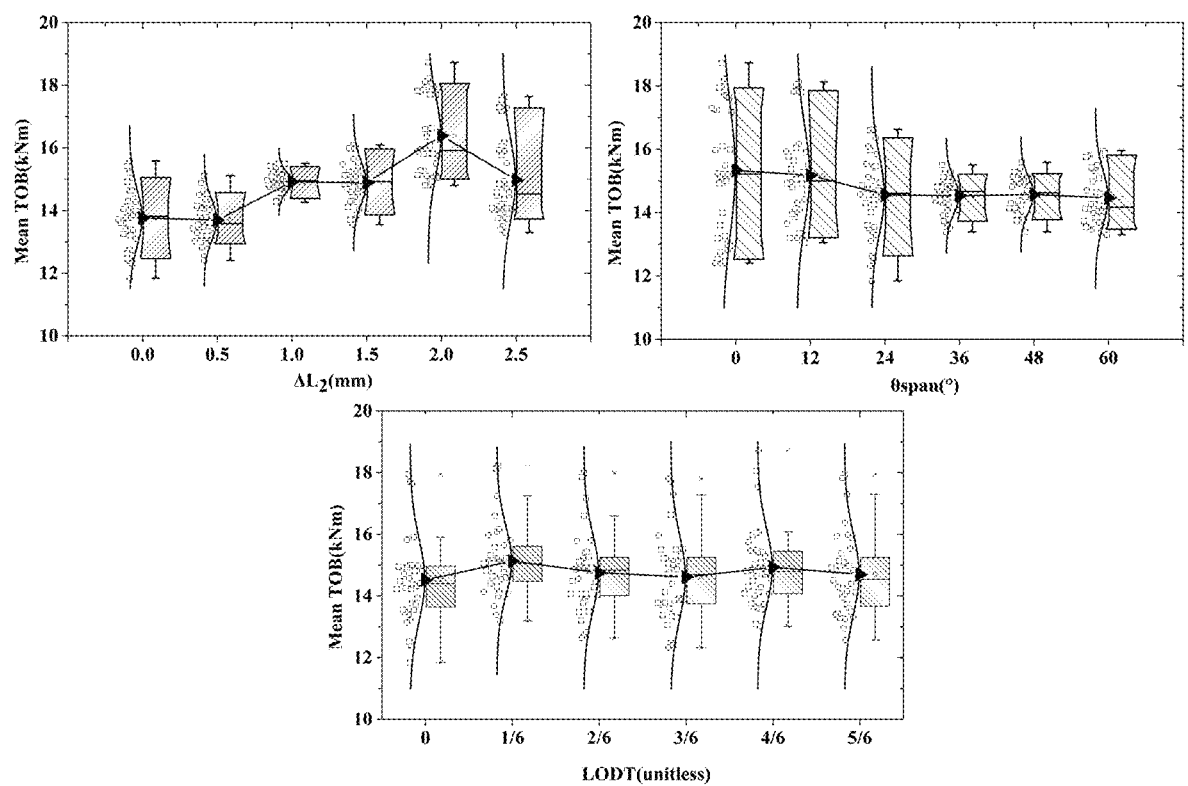
FIG. 6 is a schematic diagram of the influence of cutting depth control distance $\Delta L_2$, polar angle span $\theta_{span}$ and level of different track LODT on the torque-on-bit mean value Mean TOB.
Figure 7:
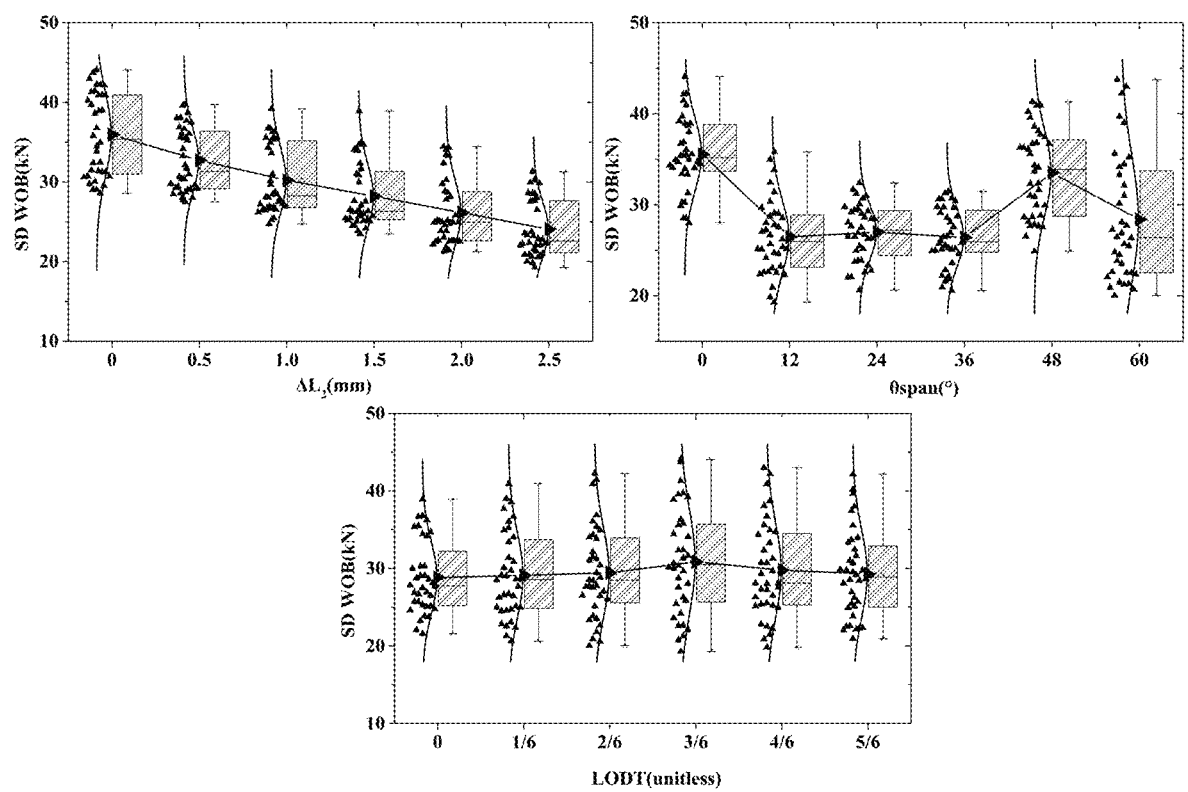
FIG. 7 is a schematic diagram of the influence of cutting depth control distance $\Delta L_2$, polar angle span $\theta_{span}$ and level of different track LODT on the weight-on-bit standard deviation SD WOB.
Figure 8:
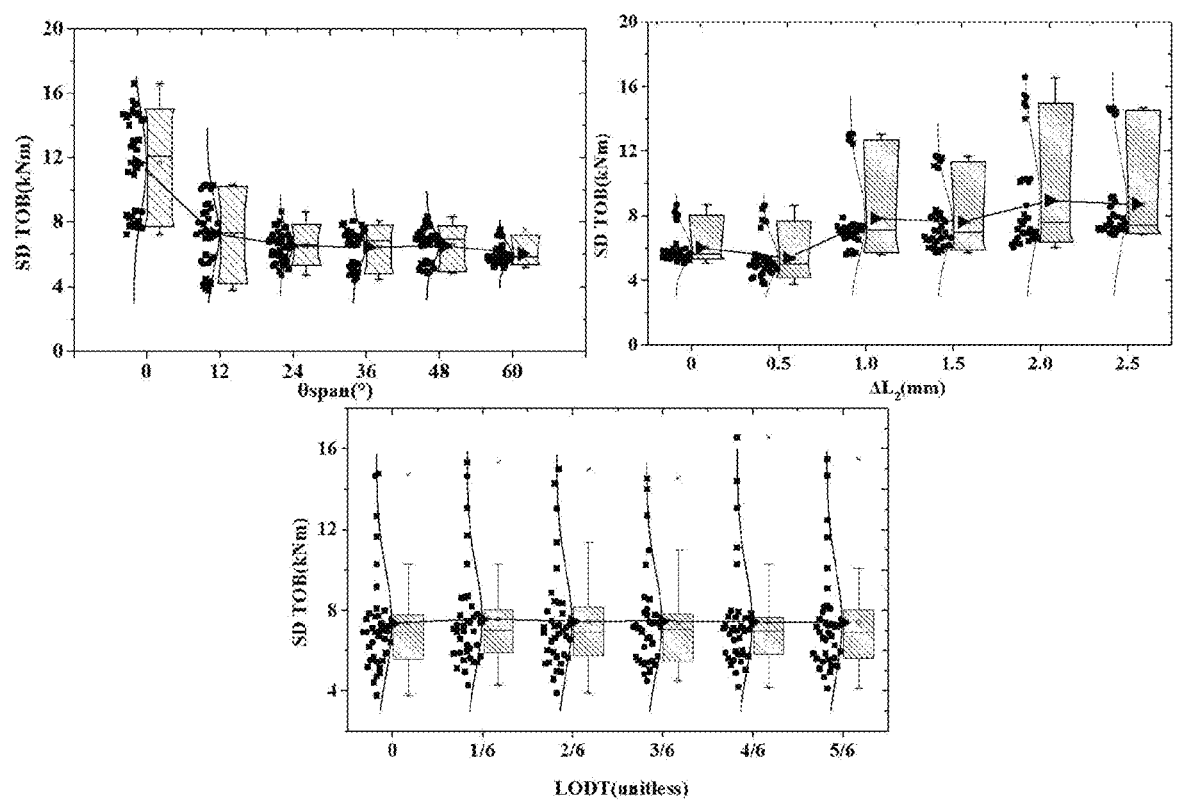
FIG. 8 is a schematic diagram of the influence of cutting depth control distance $\Delta L_2$, polar angle span $\theta_{span}$ and level of different track LODT on the torque-on-bit standard deviation SD TOB.
Figure 9:
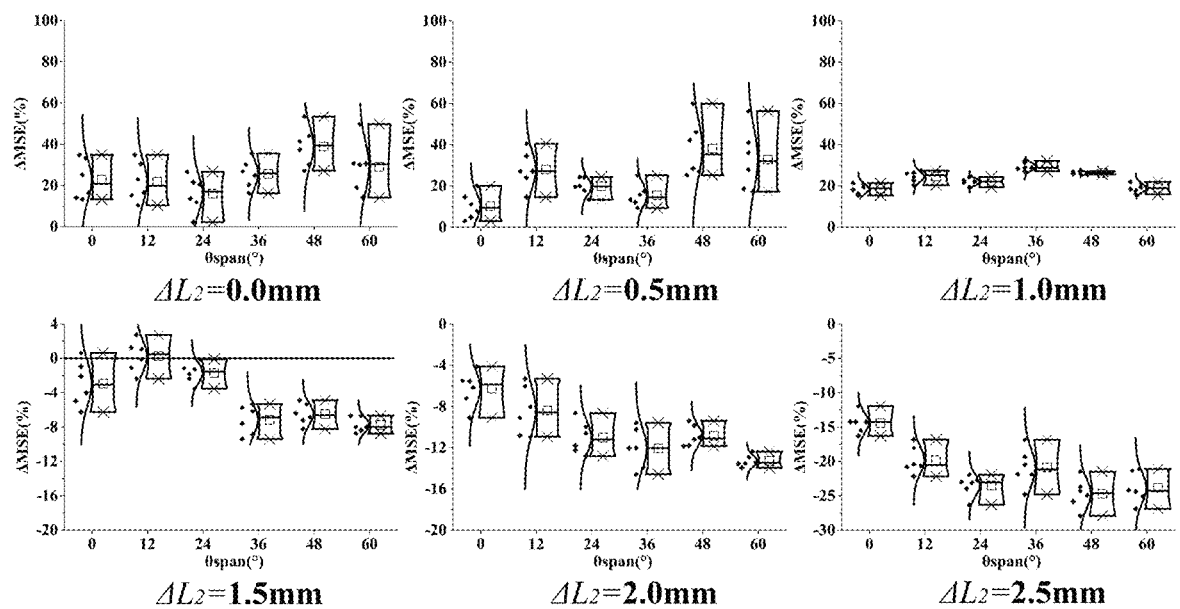
FIG. 9 is a schematic diagram of the influence of cutting depth control distance $\Delta L_2$ and polar angle span $\theta_{span}$ on mechanical specific energy change rate $\Delta MSE$.
Figure 10:
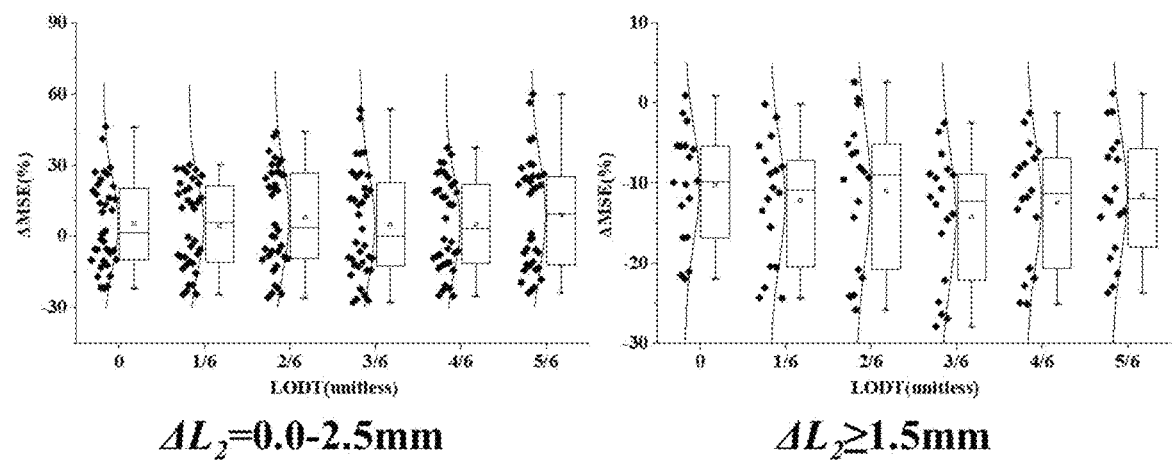
FIG. 10 is a schematic diagram of the influence of level of different track LODT on the mechanical specific energy change rate $\Delta MSE$.
Figure 11:
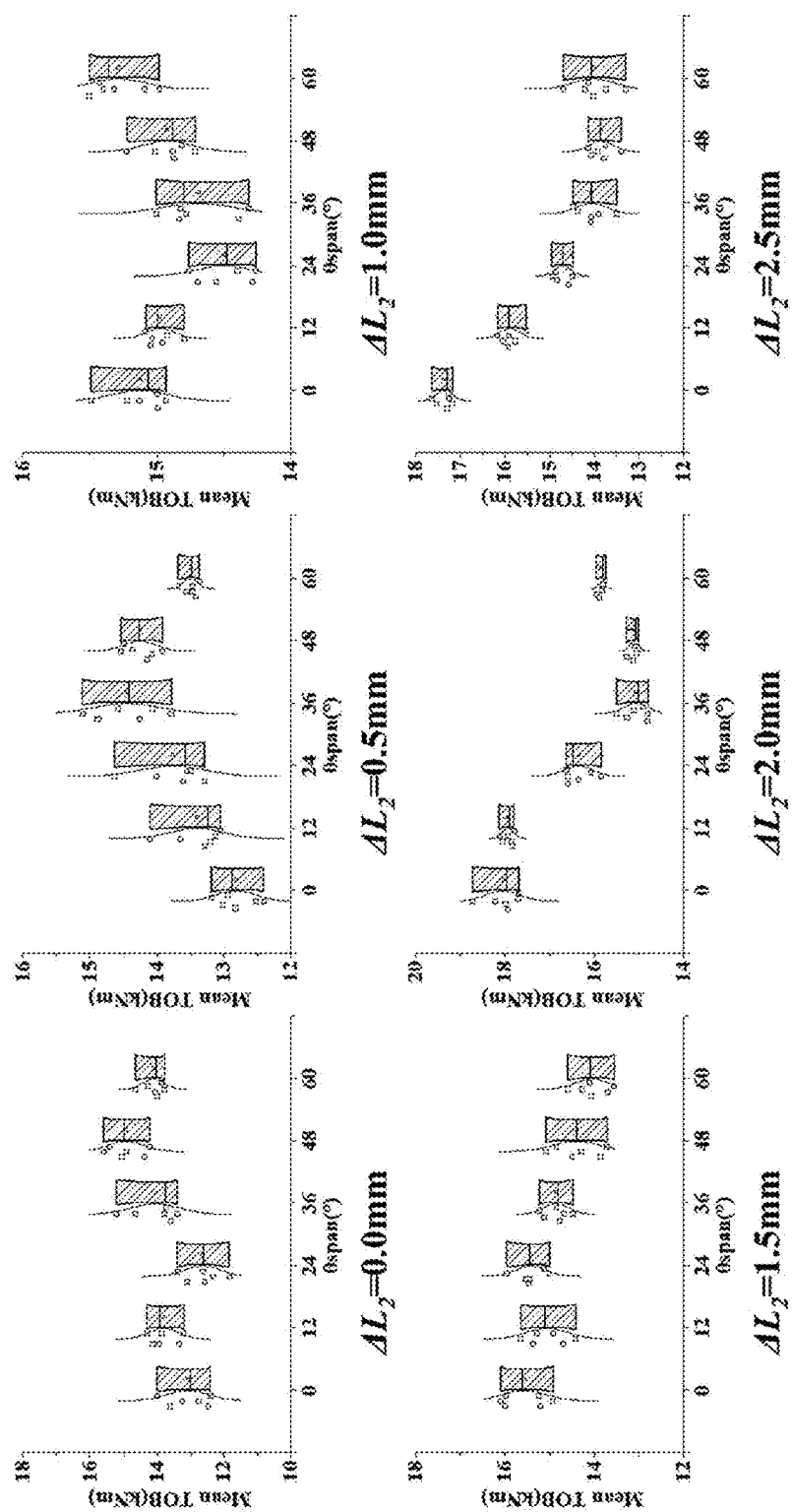
FIG. 11 is a schematic diagram of the influence of polar angle span $\theta_{span}$ on torque-on-bit mean value Mean TOB under a specific cutting depth control distance $\Delta L_2$.
Figure 12:
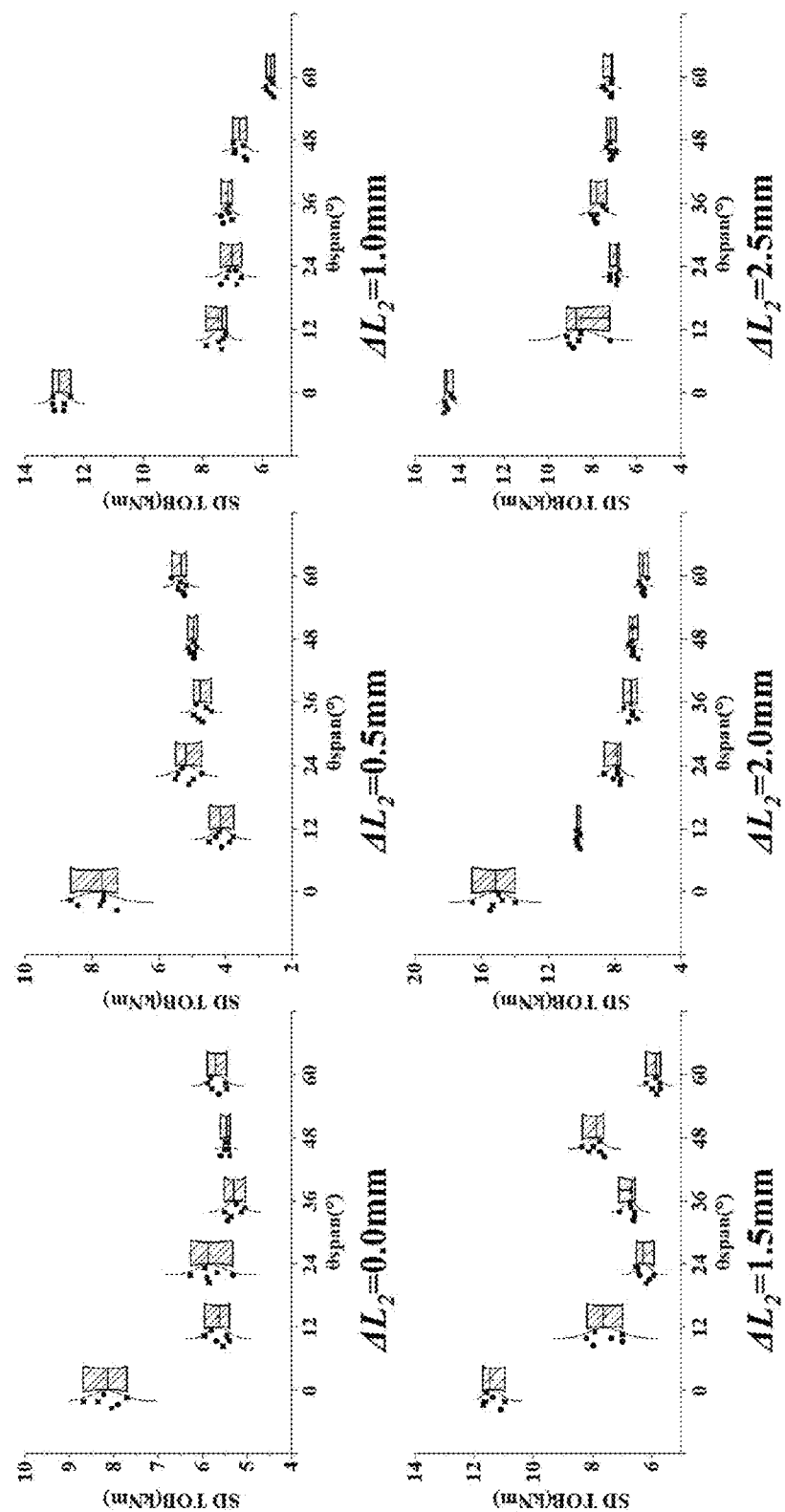
FIG. 12 is a schematic diagram of the influence of the polar angle span $\theta_{span}$ on the torque-on-bit standard deviation SD TOB under a specific cutting depth control distance $\Delta L_2$.

A time history curve for weight-on-bit WOB and torque-on-bit TOB is obtained based on the bit-rock finite element model, where the obtained time history curve for WOB and TOB has a start-up stage and a stable stage, as shown in FIG. 4.

A design scheme for the cutting structure of the PDC drill bit is established based on the time history curve for weight-on-bit and torque-on-bit.

In an embodiment, a method of establishing the design scheme for the cutting structure of the PDC drill bit based on the time history curve for weight-on-bit and torque-on-bit includes:

carrying out statistical calculation on a stable cutting section of the time history curve for weight-on-bit and torque-on-bit to obtain a weight-on-bit mean value Mean WOB, a torque-on-bit mean value Mean TOB, a weight-on-bit standard deviation SD WOB and a torque-on-bit standard deviation SD TOB;

obtaining mechanical specific energy MSE based on the weight-on-bit mean value Mean WOB and the torque-on-bit mean value Mean TOB;

obtaining an axial/circumferential vibration amplitude based on the weight-on-bit standard deviation SD WOB and the torque-on-bit standard deviation SD TOB;

taking a triaxial compressive strength $TCS_{bore}$ under pressure of downhole liquid column as a mechanical specific energy reference;

obtaining a mechanical specific energy change rate based on the mechanical specific energy and the mechanical specific energy reference; introducing the mechanical specific energy change rate ΔMSE to evaluate the rock breaking efficiency, where when ΔMSE is positive, it suggests that PDC drill bit needs extra energy to break the rock under a certain design feature, while when ΔMSE is negative, it suggests that PDC drill bit with a certain design feature reduces the energy needed to break the rock; and obtaining the design scheme for the cutting structure of the PDC drill bit based on the axial/circumferential vibration amplitude and the mechanical specific energy change rate ΔMSE, combined with engineering practice (taking the mechanical specific energy change rate ΔMSE as the objective function).

The cutting structure of PDC drill bit with spiral blades is obtained based on the design scheme for the cutting structure of the PDC drill bit.

In an embodiment, design parameters of the design scheme for the cutting structure of the PDC drill bit include level of different track LODT of the front and rear row teeth, the cutting depth control distance $\Delta L_2$ of the front and rear row teeth and polar angle span θspan.

$$\begin{cases} MSE = \text{Mean } WOB \cdot \left( \dfrac{1}{D_b} + \dfrac{13.33\mu_b RPM}{A_b ROP} \right) \\ \mu_b = 36\left( \dfrac{\text{Mean } TOB}{D_b \cdot \text{Mean } WOB} \right) \end{cases} \quad (4)$$

$$\Delta MSE = \dfrac{MSE - TCS_{bore}}{TCS_{bore}}, \quad (5)$$

where MSE represents mechanical specific energy, $10^3$ MPa, Mean WOB represents weight-on-bit mean value, kN, RPM represents rotational speed near drill bit, r/min, which takes 140 r/min in the present disclosure with consideration of engineering practice, Mean TOB represents torque-on-bit mean value, kN, $A_b$ represents area of bit, which may take $\pi D_b^2$ mm, $D_b$ represents outer diameter of bit, mm, ROP represents rate of penetration, m/h, which takes 11.25 m/h in the present disclosure with consideration of engineering practice, $\mu_b$ represents sliding friction coefficient of bit, dimensionless; ΔMSE represents mechanical specific energy change rate, % and $TCS_{bore}$ represents the triaxial compressive strength when the confining pressure is the bottom hole liquid column pressure, MPa.

Embodiment 2

Figure 14:
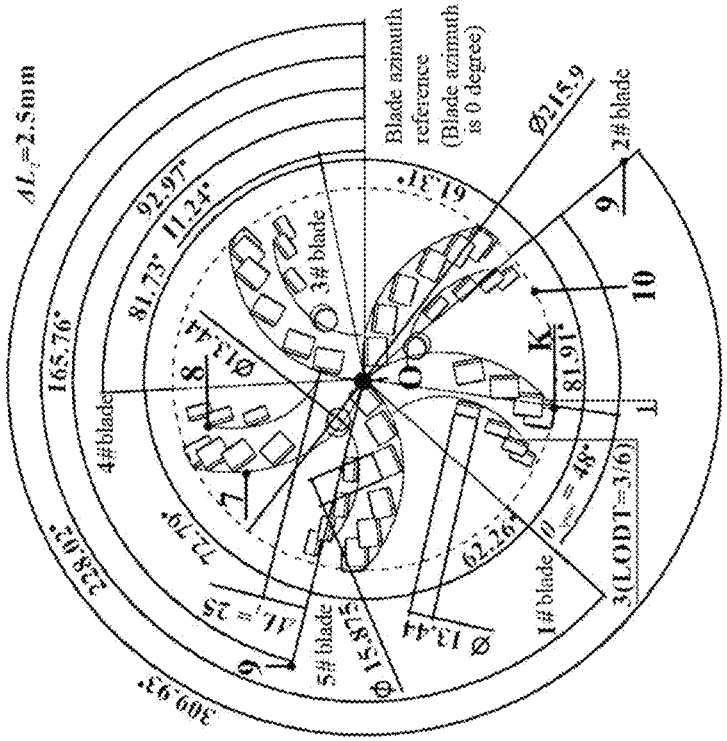
FIG. 14 is a schematic diagram of the cutting structure drawing of the proposed PDC drill bit with spiral blades.
Figure 14:
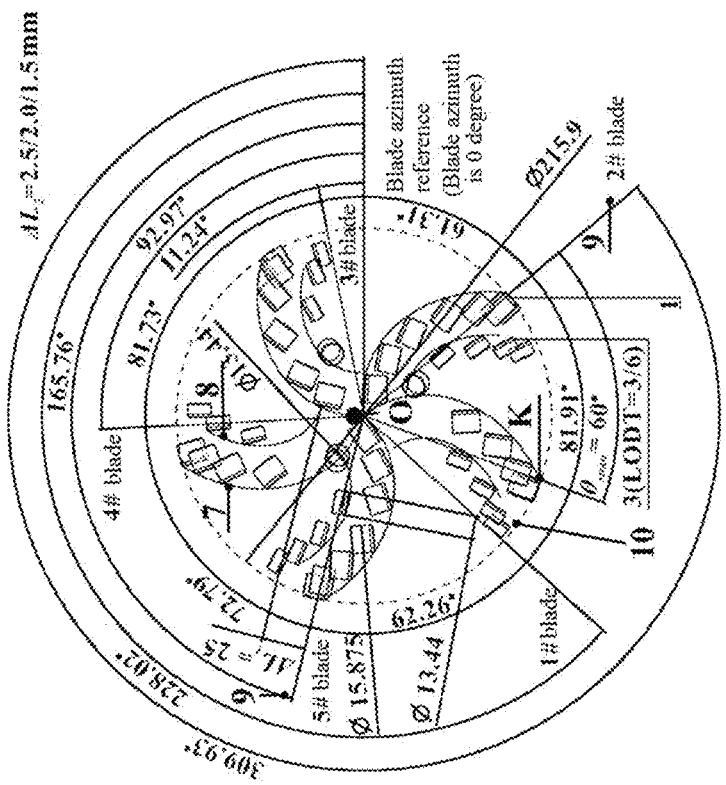

As shown in Table 2 (Table 2 is the recommended design parameters of 215.9 mm spiral blade PDC drill bit) and FIG. 14, the present disclosure provides several groups of cutting structure design schemes and design drawings of spiral blade PDC drill bit with mechanical specific energy change rate ΔMSE as the objective function, which are obtained by the method in the above embodiment.

TABLE 2

| No. | $\Delta L_2$ mm | $\theta_{span}$ ° | LODT unitless | WOB kN | SD WOB kN | TOB kNm | SD TOB kNm | ΔMSE % |
|---|---|---|---|---|---|---|---|---|
| 1 | 2.5 | 48 | 3/6 | *56.79* | 29.95 | *13.78* | 7.17 | −27.92 |
| 2 | 2.5 | 60 | 3/6 | *57.59* | *20.71* | *14.12* | 7.16 | *−26.89* |
| 3 | 2.0 | 36 | 3/6 | 67.37 | 27.57 | 14.69 | 7.11 | *−14.57* |
| 4 | 2.0 | 60 | 3/6 | 67.91 | 25.45 | *13.71* | *5.71* | −13.94 |
| 5 | 1.5 | 36 | 3/6 | 71.45 | 25.84 | *15.51* | *6.66* | −9.39 |
| 6 | 1.5 | 60 | 3/6 | 71.94 | *21.25* | 15.95 | 6.36 | −8.76 |

Figure 13:
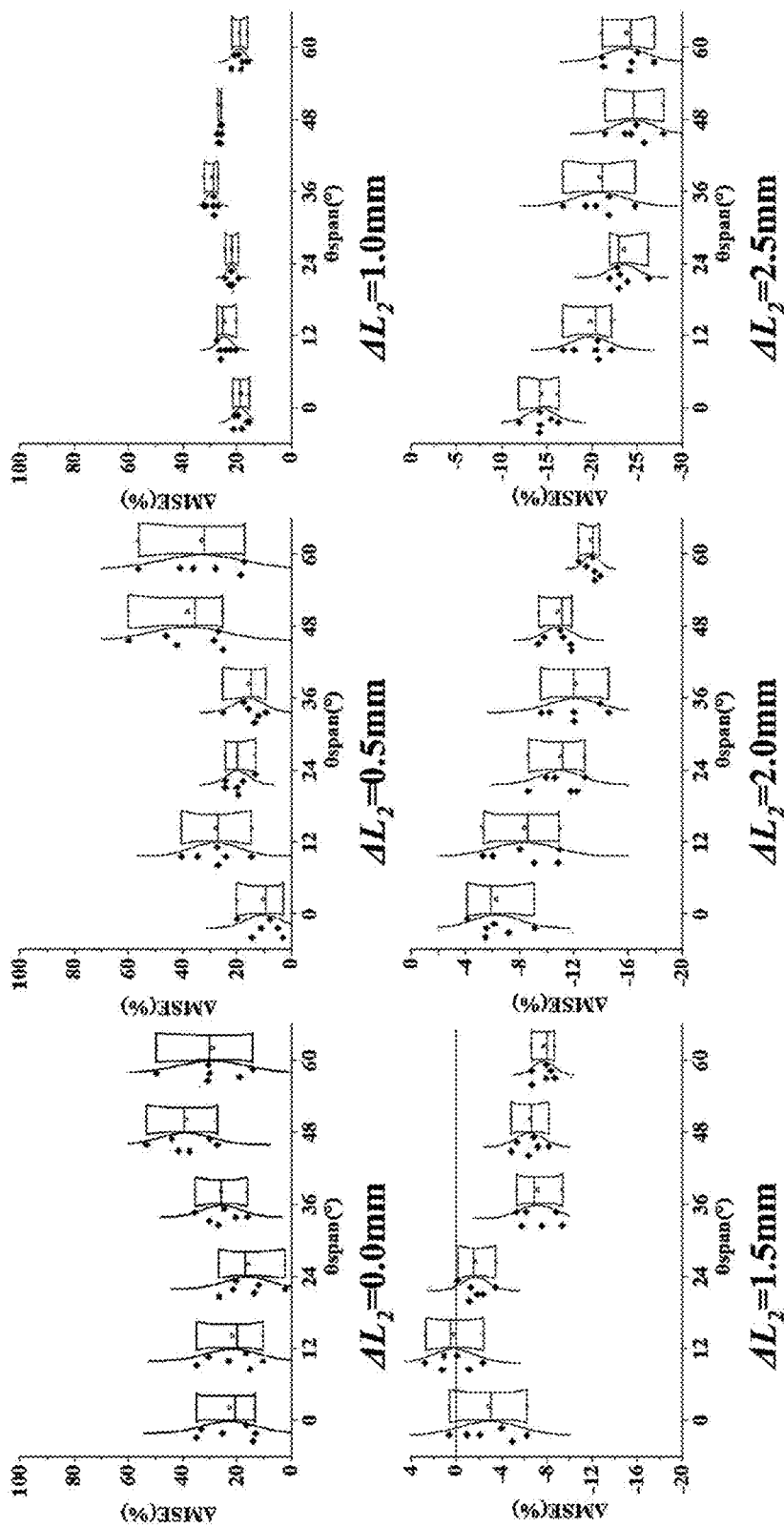
FIG. 13 is a schematic diagram of the influence of the polar angle span $\theta_{span}$ on the mechanical specific energy change rate $\Delta MSE$ at a specific cutting depth control distance $\Delta L_2$.

Referring to the calculation results of mechanical specific energy change rate ΔMSE in FIG. 13, it can be seen that when the cutting depth control distance $\Delta L_2 \geq 1.5$ mm, the mechanical specific energy change rate ΔMSE is negative, which indicates that the PDC drill bit reduces the energy required for rock breaking when the cutting depth control distance $\Delta L_2 \geq 1.5$ mm, so the cutting depth control distance $\Delta L_2 \geq 1.5$ mm should be selected.

With reference to FIG. 5, FIG. 6, FIG. 7, FIG. 8, FIG. 9, FIG. 10, FIG. 11, and FIG. 12, the influences of polar angle span $\theta_{span}$ and level of different track LODT on weight-on-bit mean value Mean WOB, torque-on-bit mean value Mean TOB, weight-on-bit standard deviation SD WOB, torque-on-bit standard deviation SD TOB and mechanical specific energy change rate ΔMSE are considered under different cutting depth control distances ($\Delta L_2 \geq 1.5$ mm).

Specifically, level of different track LODT=3/6, cutting depth control distance $\Delta L_2$ of front and rear row teeth=2.5 mm, and polar angle span $\theta_{span}$=60°, when the anti-vibration performance of the tooth material is superior to a certain rock;

level of different track LODT=3/6, cutting depth control distance $\Delta L_2$ of front and rear row teeth=2.0 mm, polar angle span $\theta_{span}$=60°, when the anti-vibration performance or stress resistance performance of the tooth material is superior to a certain rock;

level of different track LODT=3/6, cutting depth control distance $\Delta L_2$ of front and rear row teeth=1.5 mm, polar angle span $\theta_{span}$=60°, when the stress resistance of tooth material is superior to a certain rock;

level of different track LODT=3/6, cutting depth control distance $\Delta L_2$ of front and rear row teeth=2.5 mm, polar angle span $\theta_{span}$=48°, when the stress resistance of tooth material is superior to a certain rock.

The recommended design parameters of PDC drill bits with high efficiency and stable spiral blades are listed in ascending order with the mechanical specific energy change rate ΔMSE as the objective function. As shown in Table 2, the values in the cells marked with italic and underline in each column are the smallest or nearly smaller. By comparison, the corresponding design scheme is selected in combination with the axial or circumferential stress resistance performance and anti-vibration performance of cutting teeth material: ① When the anti-vibration of cutting teeth is superior for a certain rock, the design schemes numbered 1 and 2 in Table 2 can be selected to weaken the force on cutting teeth in the axial/circumferential direction. ② When the stress resistance performance of tooth material is superior to a certain rock, the design scheme with the serial number of 2, 4 or 6 in Table 2 can be selected to weaken the risk of impact damage caused by vibration of cutting teeth in the axial/circumferential direction;

According to the above-mentioned optimization principle, 1, 2, 4 and 6 in Table 2 are mainly used as reserve design schemes, and the cutting structure of PDC drill bit with spiral blades is established with the aid of computer three-dimensional aided modeling and the design drawings are output, as shown in FIG. 14, which is an example of the cutting structure of high-efficiency and stable spiral blade PDC drill bit (the bit diameter is 215.9 mm) obtained through the optimization design method proposed by the disclosure.

Embodiment 3

The present disclosure further discloses a design system for a cutting structure of a PDC drill bit with spiral blades, used for realizing the design method, including
- a test module, used for carrying out the uniaxial and triaxial compressive strength tests on the outcrops or the underground cores to obtain the rock mechanical parameters;
- a three-dimensional structure building module, used for establishing the three-dimensional cutting structure of the PDC drill bit based on the archimedean spiral and the front and rear row teeth of the PDC drill bit;
- a model building module, used for establishing the bit-rock finite element model based on the rock mechanical parameters and the three-dimensional cutting structure of the PDC drill bit;
- a time history curve acquisition module, used for obtaining the time history curve for weight-on-bit and torque-on-bit based on the bit-rock finite element model;
- a design scheme establishment module, used for establishing the design scheme for the cutting structure of the PDC drill bit based on the time history curve for weight-on-bit and torque-on-bit; and
- a design scheme application module, used for obtaining the cutting structure of PDC drill bit with spiral blades based on the design scheme for the cutting structure of the PDC drill bit.

The above-mentioned embodiments are only a description of the preferred mode of the disclosure, and do not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. A design method for a cutting structure of a polycrystalline diamond compact (PDC) drill bit with spiral blades, comprising the following steps:
   carrying out uniaxial and triaxial compressive strength tests on outcrops or underground cores to obtain rock mechanical parameters;
   establishing a three-dimensional cutting structure of the PDC drill bit based on an Archimedean Spiral and front and rear row teeth of the PDC drill bit, wherein a method for establishing the three-dimensional cutting structure of the PDC drill bit comprises:
   controlling a designed cutting section of a downhole based on a level of different track and a cutting depth control distance of the front and rear row teeth, wherein when the front and rear row teeth are on different tracks in a degree of the equidistance with an adjacent front row teeth centers, the level of different track is expressed as a multiple of the equidistance between the front row teeth centers;
   controlling a circumferential tooth distribution reference of the spiral blades based on the Archimedean Spiral; and
   establishing the three-dimensional cutting structure of the PDC drill bit based on the designed cutting section of the downhole and the circumferential tooth distribution reference of the spiral blades;
   establishing a bit-rock finite element model based on the rock mechanical parameters and the three-dimensional cutting structure of the PDC drill bit;
   obtaining a time history curve for weight-on-bit and torque-on-bit based on the bit-rock finite element model;
   establishing a design scheme for the cutting structure of the PDC drill bit based on the time history curve for weight-on-bit and torque-on-bit, wherein a method for establishing the design scheme for the cutting structure of the PDC drill bit based on the time history curve for weight-on-bit and torque-on-bit comprises:
   carrying out statistical calculation on a stable cutting section of the time history curve for weight-on-bit and torque-on-bit to obtain a weight-on-bit mean value, a torque-on-bit mean value, a weight-on-bit standard deviation and a torque-on-bit standard deviation;
   obtaining mechanical specific energy based on the weight-on-bit mean value and the torque-on-bit mean value;
   obtaining an axial/circumferential vibration amplitude based on the weight-on-bit standard deviation and the torque-on-bit standard deviation;
   taking a triaxial compressive strength under pressure of downhole liquid column as a mechanical specific energy reference;
   obtaining a mechanical specific energy change rate based on the mechanical specific energy and the mechanical specific energy reference, introducing the mechanical specific energy change rate to evaluate a rock breaking efficiency, wherein when the mechanical specific energy change rate is positive, then PDC drill bit needs extra energy to break the rock under a certain design feature, while when the mechanical specific energy change rate is negative, then PDC drill bit with a certain design feature reduces energy needed to break the rock; and obtaining the design scheme for the cutting structure of the PDC drill bit based on the axial/circumferential vibration amplitude and the mechanical specific energy change rate; and obtaining the cutting structure of PDC drill bit with spiral blades based on the design scheme for the cutting structure of the PDC drill bit.

2. The design method for a cutting structure of a PDC drill bit with spiral blades according to claim 1, wherein the rock mechanical parameters comprise density $\rho$, elastic modulus E, Poisson's ratio $\mu$, internal friction angle $\varphi$ and cohesion c.

3. The design method for a cutting structure of a PDC drill bit with spiral blades according to claim 1, wherein the designed cutting section of the downhole comprises projections or bodies of front row teeth, rear row teeth, rear row teeth with different tracks, rear row teeth with a same track, radial tooth distribution lines of the front row teeth, radial tooth distribution lines of the rear row teeth and the cutting depth control distance of front and rear row teeth on a radial tooth distribution view.

4. The design method for a cutting structure of a PDC drill bit with spiral blades according to claim 1, wherein boundary conditions of the bit-rock finite element model are rate of penetration and rotational speed near drill bit.

5. The design method for a cutting structure of a PDC drill bit with spiral blades according to claim 1, wherein design parameters of the design scheme for the cutting structure of the PDC drill bit comprise level of different track of the front and rear row teeth, the cutting depth control distance of the front and rear row teeth and polar angle span.

* * * * *